United States Patent [19]

Brois et al.

[11] 4,123,373

[45] Oct. 31, 1978

[54] LACTONE POLYOL ESTERS AS OLEAGINOUS ADDITIVES

[75] Inventors: Stanley J. Brois, Westfield; Antonio Gutierrez, Hamilton Square, both of N.J.

[73] Assignee: Exxon Research & Engineering Co., Linden, N.J.

[21] Appl. No.: 768,265

[22] Filed: Feb. 14, 1977

[51] Int. Cl.$^2$ ................. C07D 307/32; C10M 1/28
[52] U.S. Cl. ........................... 252/48.6; 252/56 R; 260/343.5; 260/343.6; 260/346.74
[58] Field of Search .................. 260/343.5, 343.6; 252/48.6, 57

[56] References Cited

U.S. PATENT DOCUMENTS

| | | | |
|---|---|---|---|
| 3,620,977 | 11/1971 | Honnen | 252/51.5 A |
| 3,936,472 | 2/1976 | Kinney et al. | 260/343.6 |
| 3,997,570 | 12/1976 | Kennedy et al. | 260/343.6 |

*Primary Examiner*—John D. Randolph
*Attorney, Agent, or Firm*—Roland A. Dexter; Frank T. Johmann

[57] ABSTRACT

Lactone polyol ester reaction products of hydrocarbon substituted lactone carboxylic acid, with polyols such as pentaerythritol and their derivatives are useful additives in oleaginous compositions, such as varnish-inhibiting dispersants for lubricating oils, and fuels.

16 Claims, No Drawings

LACTONE POLYOL ESTERS AS OLEAGINOUS ADDITIVES

BACKGROUND OF THE INVENTION AND PRIOR ART

The present invention concerns hydrocarbon soluble alkyl lactone polyol esters, their method of preparation and the utility of said lactone polyol esters preferably in hydrocarbon fuel and lubricating systems as stable sludge dispersants and/or varnish inhibiting additives.

During the past decade, ashless sludge dispersants have become increasingly important, primarily in improving the performance of lubricants and gasoline in keeping the engine clean of deposits and permitting extended crankcase oil drain periods. One category of ashless dispersants involves the esterification product alkenyl substituted acids, e.g. polyisobutenyl succinic acids, with polyols e.g. pentaerythritol, as taught in U.S. Pat. No. 3,381,022; however, such a dispersant oftentimes contains unsaturation making it susceptible to oxidative degradation especially under high severity conditions such as elevated oil temperatures and extended drain intervals. The esterification of alkenyl halolactone acids with pentaerythritol as taught in U.S. Pat. No. 3,755,173 affords more hydroxyl groups per chain but the inherent propensity of such dispersants towards elimination of corrosive HCl to give unsaturated dispersants can promote decomposition of the hydrocarbon lubricant, corrode metal engine parts and promote varnish deposition on the internal surfaces of the engine.

Other lactone esters formed from alkenylsuccinic anhydride with a polyol with acid catalyst have been recently disclosed in U.S. Pat. No. 3,936,472. However, the mode of preparation and stoichiometry afforded high molecular weight, viscous products devoid of hydroxyl groups which are believed to be essential to sludge control.

The present invention overcomes all the shortcomings of the prior art by designing polyalkyl lactone polyol esters free of unsaturation and halogen, with enhanced stability and outstanding activity as varnish-inhibiting dispersants.

SUMMARY OF THE INVENTION

It has now been discovered that saturated hydrocarbon, preferably long carbon chain, substituted structures which feature vicinal lactone and polyol ester functions can be so constructed using novel synthetic methods whereby a highly stable additive of enhanced dispersancy, enhanced viscosity properties and/or anti-rust properties is obtained. Moreover, further functionalization of the lactone polyol ester system via the new processes with vicinal hydroxyl, thiyl and sulfo groups can engender other desirable properties, such as anti-oxidation and anti-corrosion activity. This novel class of additives can be represented in part by the formula:

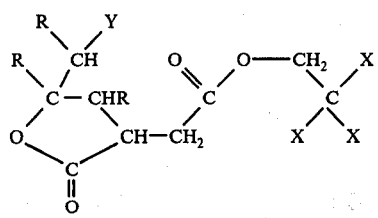

wherein R is selected from the group consisting of hydrogen, hydrocarbyl and substituted hydrocarbyl containing from 1 to 10,000 or more carbons with the restriction that at least one R has at least about 8 carbons and preferably from about 16 to about 400 carbons, X is selected from the group consisting of hydrogen, alkyl, hydroxyalkyl, $OCH_2C(CH_2OH)_3$, $-(CH_2)_nOH$ or $-(CH_2OCH_2CH_2O)_nH$ where $n$ is 1 to 3 and with the restriction that at least one X contains a hydroxy moiety and Y is selected from the group consisting of hydrogen, hydroxyl, sulfo, alkylthio (TS—), alkyldithio (TSS—), and a sulfur bridge, e.g., —S— and —S—S—, joining two lactone polyol ester units together as depicted immediately hereafter wherein $z$ is a number ranging from 1 to 4 and T is defined hereafter as containing 1 to 50, preferably 2 to 20 carbons.

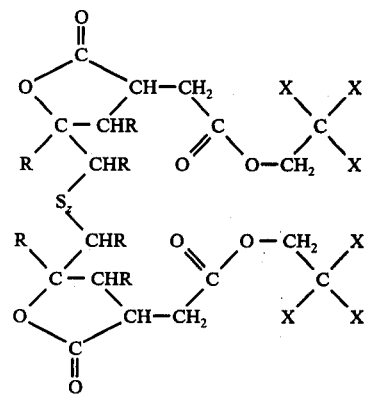

Preferred herein is polyisobutyl lactone polyol ester of number average molecular weight ($\overline{M}_n$) ranging from about 400 to about 140,000 prepared by the reaction of equimolar proportions of polyisobutyl lactone carboxylic acid with pentaerythritol at a temperature from about 100–240° C. preferably 150–180° C. until one mole of $H_2O$ per mole of reactant is removed from the reaction.

The novel compounds described above as effective detergents which are particularly useful in lubricating oil compositions are also useful as detergents in fuel compositions, such as burner fuel compositions, and motor fuel compositions, for example, in gasolines and in diesel fuels. Thus, it is within the scope of this invention to dissolve a small but at least an effective amount of said compounds of the invention in a major proportion of an oleaginous material to provide useful oleaginous compositions.

These hydrocarbon soluble compounds have at least 8 carbons in the substantially saturated aliphatic hydrocarbyl group and a carboxylic acid group of the dicarboxylic acid material converted into a lactone ring and another carboxylic acid group converted into a polyol ester as a result of the reaction of at least equimolar amounts of said hydrocarbon substituted dicarboxylic acid lactone material and a 2-polyol having about 2 to 6 hydroxy groups and containing a total of 2 to 40 carbons.

These novel alkyl lactone polyol esters of the present invention can be prepared as noted by heating together alkyl lactone acids, or esters with a polyol such as pentaerythritol as expressed in the following equation:

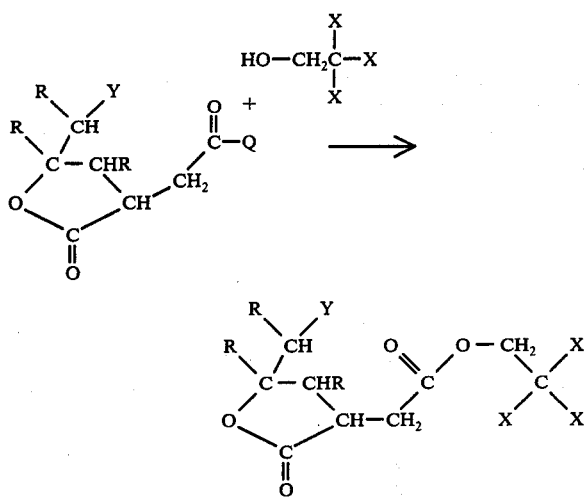

wherein R, X and Y were as earlier described; Q as later described.

ALKYL LACTONE REACTANTS

The preparation of the requisite reactants involves a lactonization of an alkenyl succinic acid analog obtained via the Ene reaction of an olefin with an alpha-beta unsaturated $C_4$ to $C_{10}$ dicarboxylic acid, or anhydrides or esters thereof, such as fumaric acid, itaconic acid, maleic acid, maleic anhydride, dimethyl fumarate, etc. The dicarboxylic acid material can be illustrated by an alkenyl substitude anhydride which may contain a single alkenyl radical or a mixture of alkenyl radicals variously bonded to the cyclic succinic anhydride group, and is understood to comprise such structures as:

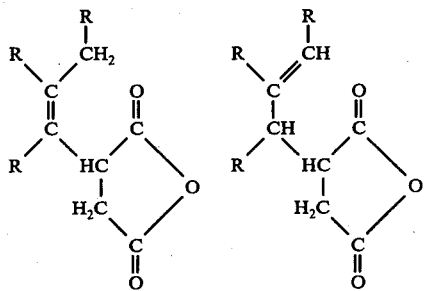

wherein R may be hydrogen or hydrocarbyl or substituted hydrocarbyl containing from 1 to about 10,000 and more carbons with the restriction that at least one R has at least 8 carbons, preferably from about 16 to about 400 carbons and optimally from about 60 to about 100 carbons. The anhydrides can be obtained by well-known methods, such as the reaction between an olefin and maleic anhydride or halosuccinic anhydride or succinic ester (U.S. Pat. No. 2,568,876). In branched olefins, particularly branched polyolefins, R may be hydrogen, methyl or a long chain hydrocarbyl group However, the exact structure may not alays be ascertained and the various R groups cannot always be precisely defined in the Ene products from polyolefins and maleic anhydride.

Suitable olefins include butene, isobutene, pentene, decene, dodecene, tetradecene, hexadecene, octadecene, eicosene, and polymers of propylene, butene, isobutene, pentene, decene and the like, and halogen-containing olefins. The olefins may also contain cycloalkyl and aromatic groups. The most preferred alkenyl succinic anhydrides used in this invention are those in which the alkenyl group contains a total of from 8 to 400 carbon atoms; and, at least 16 to 400 and more preferably 60 to 100 for mineral oil systems.

Many of these hydrocarbyl substituted dicarboxylic acid materials and their preparation are well known in the art as well as being commercially available, e.g., 2-octadecenyl succinic anhydride and polyisobutenyl succinic anhydride.

With 2-chloromaleic anhydride and related acylating agents, alkenylmaleic anhydride reactants are formed. Lactonization of these products also afford useful precursors to lactone polyol ester products.

Preferred olefin polymers for reaction with the unsaturated dicarboxylic acids are polymers comprising a major molar amount of $C_2$ to $C_5$ monoolefin, e.g., ethylene, propylene, butylene, isobutylene and pentene. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 20 mole % is a $C_4$ to $C_{18}$ non-conjugated diolefin, e.g., a copolymer of isobutylene and butadiene; or a copolymer of ethylene, propylene and 1,4-hexadiene; etc.

The olefin polymers will usually have number average molecular weights ($\overline{M}_n$) within the range of 700 and about 140,000; more usually between about 900 and about 10,000. Particularly useful olefin polymers have ($\overline{M}_n$) within the range of about 1200 and about 5000 with approximately one terminal double bond per polymer chain. An especially valuable starting material for a highly potent dispersant additive are poly alkenes e.g. polyisobutylene, having about 90 carbons.

Especially useful when it is desired that the dispersant additives also possess viscosity index improving properties are 5,000 to 200,000 e.g., 25,000 to 100,00 number average molecular weight polymers. An especially preferred example of such a V.I. improving polymer is a copolymer of about 30 to 85 mole % ethylene, about 15 to 70 mole % $C_3$ to $C_5$ mono-alpha-olefin, preferably propylene, and 0 to 20 mole % of a $C_4$ to $C_{14}$ non-conjugated diene.

These ethylene-propylene V.I. improving copolymers or terpolymers are usually prepared by Ziegler-Natta synthesis methods, e.g., see U.S. Pat. No. 3,551,336. Some of these copolymers and terpolymers are commercially available such as VISTALON$^R$, an elastomeric terpolymer of ethylene, propylene and 5-ethylidene norbornene, marketed by Exxon Chemical Co., New York, N.Y. and NORDEL$^R$, a terpolymer of ethylene, propylene and 1,4-hexadiene marketed by E. I. Du Pont de Nemours & Co.

Unsubstituted or simple lactone reactants (Y=H) are readily obtained by the acid-catalyzed lactonization of an alkenyl dicarboxylic acid analog, the latter being derived from the ring scission of an alkenyl succinic anhydride with water, or alcohol as shown below wherein HQ represents water or an alcohol containing from 1 to 10 carbons and R is as previously defined.

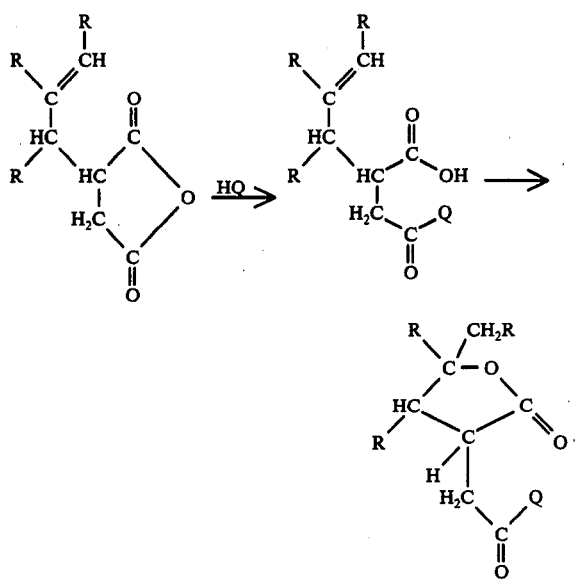

The reaction with HQ is assumed to open the anhydride at the least congested carbonyl group and form a succinic acid or hemi-ester product which in the presence of an acid catalyst cyclizes mostly to the 5-ring lactone product as shown above.

It is possible to use alkenyl substituents with the double bond in the 1, 2, or 3-position or even double bonds further out on the hydrocarbyl chain since the acid catalyst is capable of moving it into a position suitable for lactone formation. In general, the size of the lactone ring formed will depend upon, inter alia, the position of the double bond, and which carboxylic acid group participates in the lactone forming reaction. As a consequence, both 5- and 6-ring (or larger ring) lactones can be envisaged as illustrated below:

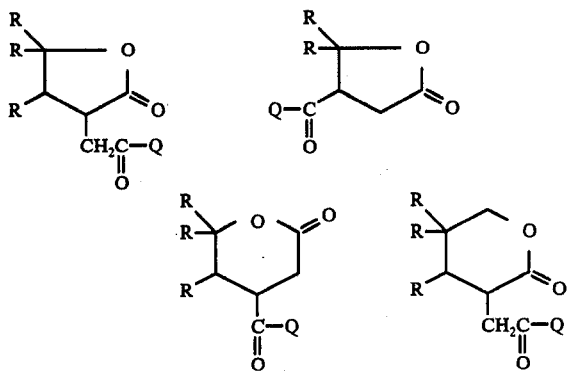

For convenience, the products of the present invention are usually shown as 5-ring lactones although larger ring lactone products can also be present.

Lactonization Catalysts

The intramolecular cyclization step involved in the process of this invention must be carried out in the presence of an acid-type catalyst in order to effect formation of the lactone. Suitable catalysts include the mineral acids such as hydrochloric acid, sulfuric acid, perchloric acid, and phosphoric acid; the sulfonic acids such as the alkanesulfonic acids and the arylsulfonic acids; the Lewis type acids such as aluminum chloride, boron trifluoride, antimony trichloride, and titanium tetrachloride; low molecular weight sulfonic acid type ion exchange resin materials, such as cross-linked sulfonated polystyrene which is commercially available as Dowex-50. The alkanesulfonic acid catalysts are preferably the lower alkanesulfonic acids containing from 1 to 12 carbon atoms, for example, methanesulfonic acid, ethanesulfonic acid, propanesulfonic acid, and butanesulfonic acid. If desired, a mixture of lower alkanesulfonic acids can be used and such a mixture containing methane, ethane, and propanesulfonic acids is commercially available. Ordinarily, the alkanesulfonic acid will comprise from 92% to 95% sulfonic acid, from 1 to 2% sulfuric acid, and from 3 to 6% water. The arylsulfonic acid catalyst which can be used in the process includes the benzenesulfonic acids, toluenesulfonic acid, and chlorobenzenesulfonic acids, with p-toluenesulfonic acid and 4-chloro-benzenesulfonic acid being preferred. The amount of catalyst present in the reaction zone can be varied over wide limits depending upon the nature of the reactants and the catalyst used. The amount of catalyst used is also determined to a considerable extent by the temperature selected for conducting the reaction. Thus, at higher temperatures the amount of catalyst required in the reaction is less than when lower temperature are used and the use of excessive amounts of catalyst at the more elevated temperatures will promote the formation of undesired side products. Ordinarily, the amount of catalyst used will be between about 0.1% up to 10% by weight of the amount of the alkenyl succinic anhydride reactant.

Substituted Lactone Reactants

The presence of certain heteroatoms adjacent to the novel lactone polyol ester combination oftimes endows the novel lactone polyol ester with other desirable properties such as antioxidation and anticorrosion activity. In the present invention, novel ways of introducing hydroxyl, thiyl, sulfide, sulfoxide, sulfone and sulfo groups adjacent to the lactone polyol esters functions are described below:

Epoxy and Hydroxy Lactone Reactants

Hydroxyl containing lactone reactants are prepared via the addition of peracids, hydrocarbyl peroxides or aqueous hydrogen peroxide to alkenyl succinic acid or hemiester reagents as shown below:

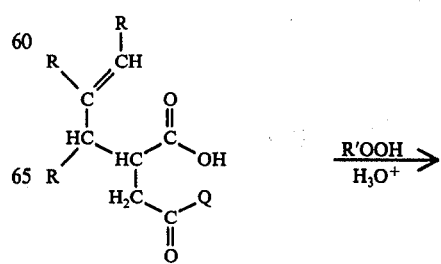

-continued

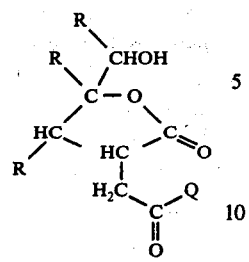

wherein R and Q are as previously defined and R' represents hydrogen, an acyl group containing from 2 to 20 carbons or an alkyl group containing from 2 to 20 carbons. As an alternate, the epoxidation of alkenyl succinic anhydride, with peracids gives epoxy anhydrides which can react with (1) water or alcohols to generate the desired hydroxy-substituted lactone reactants or (2) directly with a polyol to give the lactone polyol ester end-products.

The thiyl substituted lactones can be conveniently prepared via (1) thiol-induced scission of the epoxide ring in epoxy anhydrides as shown below wherein T represents alkyl, aryl or heterocyclic groups containing from 1 to 50 carbons

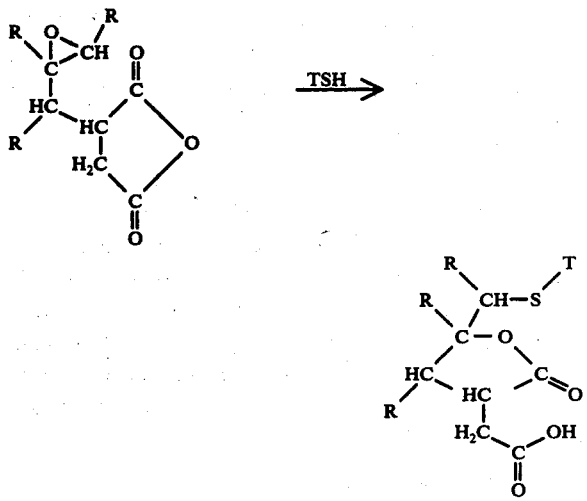

or via (2) sulfenyl halide addition to the double bond in alkenyl succinic acids or esters followed by lactonization via an internal displacement of halide as shown below:

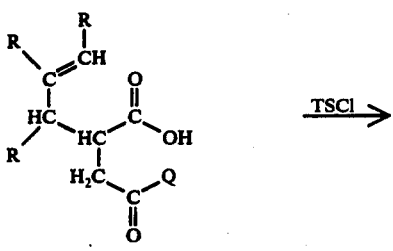

-continued

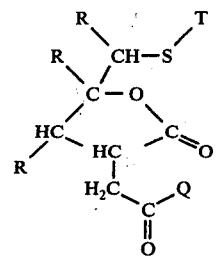

wherein T is defined as above and R and Q are as previously defined.

The type of thiyl substituted lactone product will depend upon (i) the moe of epoxide cleavage by the thiol reagent and (ii) the mode of addition of the sulfenyl chloride to the double bond in the alkenyl succinic acid or ester reactant.

With sulfur halides ($S_xCl_2$, where $x$ is 1-4), thio, dithio and polythio bis-lactones are formed. Subsequent reaction of the latter with a polyol affords the corresponding thio-bis-lactone polyol ester products.

Oxidation of the mono-thio-bis-lactones with peroxides can yield both sulfoxides and sulfones. In the case of the dithio-bis-lactones, oxidation affords sulfo-containing lactones.

In another approach thiyl lactones can also be designed by addition of the sulfenyl chloride reagent to the alkenyl succinic anhydride. Lactonization of the adduct can then be effected by either reacting (i) the sulfenyl chloride adduct per se, or (ii) the dehydrohalogenated adduct with an alcohol or water. Lactonization of the dehydrohalogenated thiyl substituted anhydride via option (ii) is preferably conducted in the presence of an acid catalyst.

Examples of useful thiols in preparing thiyl lactones via epoxide cleavage include alkyl and aryl thiols and heterocyclic thiols such as 2-mercapto-benzothiazole. Dithiophosphoric acids, e.g, $(RO)_2P(=S)$—SH, are also useful in designing phosphorus-containing products. In an alternate synthetic approach, the sulfenyl chloride analogs of the above-described thiols can be added to alkenyl succinic acids analogs to give the desired thiyl-substituted lactone reagents.

In another embodiment of the present invention, the reaction of chlorosulfonic acid or its equivalent, e.g., $SO_3$ and its complexes, with alkenylsuccinic anhydrides gives adducts which upon hydration yield sulfo lactone acids. Treatment of the latter with polyol can under suitable conditions generate sulfo lactone polyol ester end-products.

THE POLYOL

The polyhydric alcohol used to react with the lactone carboxylic acid or ester can have a total of 4 to 10 carbon atoms and can be represented by the formula:

wherein X is hydrogen, an alkyl, or hydroxy alkyl group, with at least one of the X substituents being a hydroxy alkyl group and preferably all of the X substituents being a hydroxy alkyl group of the structure —$(CH_2)_nOH$, wherein $n$ is 1 to 3.

Examples of such polyols are illustrated by ethylene glycol, diethylene glycol, triethylene glycol, tetraethylene glycol, dipropylene glycol, tripropylene glycol, dibutylene glycol, tributylene glycol, and other alkylene glycols in which the alkylene group contains from two to about eight carbon atoms. Other useful polyhydric alcohols include glycerol, monooleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, etc., likewise may yield the esters of this invention. The carbohydrates may be exemplified by glucose, fructose, sucrose, rhamnose, mannose, glyceraldehyde, and galactose.

An especially preferred class of polyhydric alcohols are those having at least three hydroxyl groups, such as pentaerythritol, dipentaerythritol, tripentaerythritol, sorbitol and mannitol. Solubility of some polyhydric alcohols may be increased by esterifying some of the hydroxyl groups with a monocarboxylic acid having from about 8 to about 30 carbon atoms such as octanoic acid, oleic acid, stearic acid, linoleic acid, dodecanoic acid, or tall oil acid. Examples of such partially esterified polyhydric alcohols are the monooleate of sorbitol, distearate of sorbitol, monooleate of glycerol, monostearate of glycerol, and dodecanoate of erythritol. Because of its effectiveness, availability, and cost, pentaerythritol is particularly preferred.

ESTERIFICATION CONDITIONS

The esters of the invention may be readily prepared by one of several methods including, if desired, the esterification in the presence of a catalyst. The method which is preferred because of the superior properties of the esters it produces and the formation of the novel lactone polyol esters in very high yield, can be effected by adding at least about 1 molar equivalent of the aforesaid polyol per mole equivalent of the polyalkyl lactone acid, or ester with or without an inert diluent, and heating the mixture at 100°–240° C., preferably 170°–220° C. until reaction is complete by infra-red analysis of the product showing maximal absorption for ester.

The water formed as a by-product is removed by distillation as the esterification proceeds. A solvent may be used in the esterification to facilitate mixing and temperature control. It also facilitates the removal of water from the reaction mixture. The useful solvents which are inert solvents in the above reaction include hydrocarbon oils, e.g. mineral lubricating oil, kerosene, neutral mineral oils, xylene, halogenated hydrocarbons, e.g., carbon tetrachloride, dichlorobenzene, tetrahydrofuran, etc.

In some instances it is advantageous to carry out the esterification in the presence of a catalyst such as sulfuric acid, Amberlyst 15 (sulfonated polystyrene), benzene sulfonic acid, p-toluene sulfonic acid, phosphoric acid, etc. The amount of the catalyst in the reaction may be as little as 0.01% (by weight of the reaction mixture), more often from about 0.1% to about 5%.

The relative proportions of the lactone acid reactant and the polyhydroxy reactant which are to be used depend to a large measure upon the type of the product desired and the number of hydroxyl groups present in the molecule of the hydroxy reactant. For instance, the formation of an ester of the lactone acid, i.e., one in which the acid radical is esterified, involves the use of one molar equivalent of the polyol for each mole of lactone acid.

Thus, the maximum proportion of the lactone acid to be used with a polyhydric alcohol is determined by the number of hydroxyl groups present in the molecule of the hydroxy reactant. For the purposes of this invention, it has been found that esters obtained by the reaction of one equivalent of the lactone acid reactant to one molar amount of the hydroxy reactant have superior properties and are therefore preferred.

USE OF THE POLYALKYL LACTONE POLYOL ESTER ADDITIVE IN OLEAGINOUS COMPOSITIONS

The oil-soluble lactone polyol ester reaction products of the invention can be incorporated in a wide variety of oleaginous compositions for sludge and varnish control. They can be used in lubricating oil compositions, such as automotive crankcase lubricating oils, automatic transmission fluids, etc., in concentrations generally within the range of about 0.01 to 20 wt. %, e.g. 0.1 to 10 weight percent, preferably 0.3 to 3.0 weight percent, of the total composition. The lubricants to which the lactone polyol ester products can be added include not only hydrocarbon oils derived from petroleum but also include synthetic lubricating oils such as polyethylene oils; alkyl esters of dicarboxylic acid; complex esters of dicarboxylic acid, polyglycol and alcohol; alkyl esters of carbonic or phosphoric acids; polysilicones; fluorohydrocarbon oils; mixtures of mineral lubricating oil and synthetic oils in any proportion, etc.

When the products of this invention are used as multifunctional additives having detergent and anti-rust properties in petroleum fuels such as gasoline, kerosene, diesel fuels, No. 2 fuel oil and other middle distillates, a concentration of the additive in the fuel in the range of 0.001 to 0.5 weight percent, based on the weight of the total composition, will usually be employed.

When used as an antifoulant in oleaginous, e.g. mineral oil, streams in refinery operations to prevent fouling of process equipment such as heat exchangers or in turbine oils, about 0.001 to 2 wt. % will generally be used.

The additive may be conveniently dispensed as a concentrate comprising a minor proportion of the additive, e.g., 20 to 90 parts by weight, dissolved in a major proportion of a mineral lubricating oil, e.g., 10 to 80 parts by weight, with or without other additives being present.

In the above compositions or concentrates, other conventional additives may also be present including dyes, pour point depressants, antiwear agents such as tricresyl phosphate or zinc dialkyldithiophosphates of 3 to 8 carbon atoms in each alkyl group, antioxidants, such as N-phenyl α-naphthylamine, tert-octylphenol sulfide, 4,4-methylene bis(2,6-di-tert-butyl phenol), viscosity index improvers such as ethylene-propylene copolymers, polymethacrylates, polyisobutylene, alkyl fumarate-vinyl acetate copolymers and the like, deemulsifiers such as polysiloxanes, ethoxylated polymers and the like.

This invention will be further understood by reference to the following examples, which include preferred embodiments of the invention.

SIMPLE LACTONE REACTANTS

EXAMPLE 1

POLYBUTYL ($\overline{M}_n$ OF 960) LACTONE ACID

One hundred twenty grams of polybutenyl succinic anhydride (PIBSA) of ($\overline{M}_n$) ≈ 960 and having a Saponification Number (Sap. No.) of 92 were diluted in 100 ml of tetrahydrofuran (THF). Two grams of water were added and the resulting mixture was heated to reflux temperature for about 2 hours. Infrared analyses of the mixture showed that the anhydride was fully converted to the succinic acid analog. The THF solvent was boiled off and 1 ml of concentrated sulfuric acid was added to the mixture at about 110° C. Heating for 2 hours at 120° C effected the conversion of the polybutenyl succinic acid to the desired lactone acid product. Infrared analyses showed the presence of strong absorption bands at about 6.5–8.5 microns which is characteristic of lactone acids.

The mixture was diluted in 200 ml of hexane, washed twice with 200 ml of water and subsequently concentrated by rotoevaporation for 2 hours at 80° C. Infrared analysis of the lactone acid product treated with diethylamine featured an infrared spectrum with a strong lactone carbonyl absorption band at 5.64 microns.

EXAMPLE 2

POLYBUTYL (($\overline{M}_n$) OF 960) LACTONE ACID

Six houndred grams of a ca. 51 wt. % solution of the PIBSA (as described in Example 1) dissolved in Solvent 150 Neutral oil, 4 g of water, and 2 g of Amberlyst 15 catalyst were heated at about 100° C for about 8 hours, and then at 130° C for 2 hours. Infrared analysis showed the presence of lactone, acid by the presence of strong absorption bands at about 6.5–8.5 microns. The product was diluted with hexane, filtered, and rotoevaporated at 80° C for 4 hours. The residue upon treatment with an excess of diethylamine featured an infrared spectrum with an intense lactone carbonyl absorption band at 5.64 microns.

EXAMPLE 3

POLYBUTYL ($\overline{M}_n$ OF 1400) LACTONE ACID

A mixture of 52 g (ca. 0.04 mole) of polyisobutenyl succinic anhydride of ($\overline{M}_n$) ≈ 1400 and having a Sap. No. of 80), 2 g of water and 5 g of Amberlyst 15 catalyst were heated for about 8 hours at 105° C. Infrared analysis indicated that the anhydride was directly and completely converted to the desired lactone acid as evidenced by the strong carbonyl absorption bands at from 5.63 to 5.84 microns. The IR spectrum of the amber concentrate treated with an excess of diethylamine showed a strong lactone carbonyl absorption at 5.64 microns.

EXAMPLE 4

EPOXYPOLYBUTENYL (($\overline{M}_n$) of 960) SUCCINIC ANHYDRIDE

Approximately 0.2 mole (240 g) of polyisobutenyl-succinic anhydride of ($\overline{M}_n$) ≈ 960 having a Saponification No. of approximately 84 was dissolved in 1 liter of methylene chloride at 25° C and the well-stirred solution was treated with 5 g portions of 0.2 mole (40.6 g) of m-chloroperbenzoic acid over an hour period. An exothermic reaction ensued, and raised the temperature of the reaction mixture to 34° C. Upon standing overnight, m-chlorobenzoic acid separated from solution. Filtration ave a clear methylene chloride solution which was washed with aqueous 5% $Na_2CO_3$ solution, and distilled water, and then dried over $CaCl_2$. Rotoevaporation at 70° C for 2 hours afforded 42 g of epoxy polybutenyl succinic anhydride as an amber oil.

EXAMPLE 5

EPOXY POLYISOBUTENYL (($\overline{M}_n$) OF 1300) SUCCINIC ANHYDRIDE

Two hundred grams of polyisobutenylsuccinic anhydride of ($\overline{M}_n$) ≈ 1400 having a Saponification No. of about 100 were dissolved in a liter of $CH_2Cl_2$ and 40.5 g (0.2 mole) of m-chloroperbenzoic acid (85%) were added portionwise over an hour period to the well-stirred reaction mixture at room temperature. The exothermic reaction caused the temperature of the mixture to peak to 33° C. The clear solution was allowed to stir at ambient temperature for 5 hours. During this period, white solids separated from solution. The solids were removed by filtration, and the supernatant was freed of $CH_2Cl_2$, and diluted in hexane and filtered. Rotoevaporation at 80° C for 2 hours gave a concentrate (180 g) which was diluted in 90 g of neutral oil to provide a 66.6 wt. % epoxy polyisobutenyl succinic anhydride product in oil.

EXAMPLE 6

HYDROXY POLYBUTYL LACTONE ACID

A mixture comprising ~0.32 mole (410 g) of PIBSA (($\overline{M}_n$) of 960) with a Sap. No. of 83, 0.32 mole (36.3 g) hydrogen peroxide (30% aqueous solution) and 0.4 g (0.1 wt. %) of concentrated sulfuric acid was heated with stirring at about 120° C for approximately 5 hours. Infrared analyisis showed the presence of carbonyl bands ascribable to lactone acid. The product was diluted with an equal weight of neutral oil.

EXAMPLE 7

HYDROXY POLYBUTYL LACTONE OCTANOL ESTER

Ca. 0.1 mole (121 g) of the product prepared in Example 6 and 0.1 mole (13.4 g) of n-octanol were heated together for about 12 hours. The product was diluted with an equal weight of neutral oil and filtered. The infrared spectrum of the oil-diluted product featured the lactone and ester carbonyl absorptions at 5.62 and 5.74 microns.

EXAMPLE 8

THIO-BIS-(POLYBUTYL LACTONE ACID)

Approximately 130 g of polyisobutenylsuccinic acid (($\overline{M}_n$) of 960) (prepared via hydrolysis of PIBSA having a Sap. No. of ca. 84) were dissolved in 400 ml of chloroform and 0.05 mole (5.3 g) of $SCl_2$ was added dropwise to the stirred solution. After refluxing the mixture overnight, two drops of sulfuric acid were added, the solvent was stripped off, and the mixture heated at about 100° C. overnight. The product featured an infrared spectrum with strong carbonyl absorption bands in the 5.6–5.8 micron region and analyzed for 1.69% sulfur and 0.09% chlorine. The IR spectrum of the diethylamine-treated product revealed a strong lactone carbonyl band at 5.63 microns.

EXAMPLE 9

THIO-BIS(POLYBUTYL LACTONE ACID)

Ca. 0.1 mole (130 g) of polyisobutenylsuccinic anhydride ($\overline{M}_n$) of 960 having a Sap. No. of ca. 84 was dissolved in 100 ml of dioxane and 0.05 mole (5.3 g) of $SCl_2$ was added dropwise to the well-stirred solution at ca. 25° C. The mixture was then refluxed for 4 hours (HCl evolution noted). At this point, 4 g of water acidified with three drops of concentrated sulfuric acid were added and the mixture was further refluxed for 24 hours. The mixture was filtered through basic Celite and rotoevaporated at 90° C. for several hours. The concentrate featured an IR spectrum with strong absorption bands in the 5.6–5.8 micron region, and anaylzed for 1.55% sulfur and 0.09% chlorine.

EXAMPLE 10

POLYBUTYL LACTONE POLYOL ESTERS

One hundred forty grams (~0.11 mole) of polyisobutyl lactone acid prepared according to the procedure outlined in Example 1 and 14 grams (0.103 mole) of pentaerythritol were mixed and gradually heated to 170° C. The stirred reaction mixture was kept at 170° C for about an hour and then heated at 175° for an additional 2 hours. During the soaking period, the reaction mixture was sparged with nitrogen (ca. 0.5 liter/min) to acilitate the removal of the water of reaction. The infrared spectrum of the residue featured broad bands at 2.9–3.0 microns (hydroxyl absorption) and 5.65–5.85 microns (lactone and ester carbonyl absorption bands). The product was dissolved into Solvent 150 Neutral mineral oil to provide a 50 wt. % solution which analyzed for 3.30 wt. % oxygen and featured a hydroxyl number of 38.6.

EXAMPLE 11

Sixty-five grams (~0.05 mole) of polyisobutyl lactone acid prepared according to Example 1 and 3.4 g (0.025 mole) of pentaerythritol were combined and heated to about 180° C. After stirring the mixture at this temperature for an hour, the temperature was raised to 200° C. After heating at the latter temperature for about 2 hours, the reaction mixture was cooled and diluted with an equal weight of Solvent 150 Neutral oil to provide a 50 wt. % solution which featured an infrared spectrum consistent with the lactone polyol ester product.

EXAMPLE 12

One hundred grams (~0.05 mole) of the polyisobutyl lactone acid prepared as in Example 2 and 6.8 g (0.05 mole) of pentaerythritol were mixed and heated gradually to 200° C. The reaction mixture was stirred at 200° C for 3 hours, then filtered and anaylzed. The filtrate featured an infrared spectrum with hydroxyl absorption at 2.9 microns and intense lactone and ester carbonyl absorptions in the 5.65–5.85 micron region.

The product analyzed for 4.76% oxygen and was found to have a hydroxyl number of 77.9.

EXAMPLE 13

Twenty-five grams (~0.018 mole) of polyisobutyl lactone acid prepared according to the procedure outlined in Example 3, and 2.5 g (0.018 mole) of pentaerythritol were mixed and heated to 150° C for an hour. The reaction temperature was raised to 200° C and the stirred mixture was maintained at this temperature for 2 hours. Solvent 150 Neutral oil was added to the residue to give a 51 wt. % oil solution of the lactone polyol ester. The filtered product solution featured an infrared spectrum with prominent absorption bands at 2.9, 5.65 and 5.8 microns consistent with the presence of hydroxyl, lactone and ster functionality. The product solution featured a hydroxyl number of 51.9.

EXAMPLE 14

Thirty-four grams (ca. 0.02 mole) of polyisobutyl lactone acid [prepared via the Amberlyst 15 catalyzed lactonization of polyisobutenyl succinic acid having a ($\overline{M}_n$) 1400 and a Sap. No. of 63] and 2.72 g (0.02 mole) of pentaerythritol were combined and heated to 200° C. The stirred reaction mixture was kept at about 200° C for 4 hours, then diluted with Solvent 150 N oil and filtered. The 51% oil solution of lactone polyol ester featured an infrared spectrum with the characteristic absorption bands for hydroxyl, lactone and ester carboxyl functional groups. Analysis showed the product solution to have a hydroxyl number of 152.

EXAMPLE 15

One hundred thirty grams of a product prepared as in Example 6 and 6.8 grams (0.05 mole) of pentaerythritol were mixed and heated to 200° C. Infrared anaylsis of the reaction mixture soaked for 2 hours at 200° C indicated that complete conversion to the desired hydroxy polyisobutyl lactone polyol ester had been achieved. Similar products were prepared via the reaction of the products described in Examples 4 and 5 with pentaerythritol according to the foregoing procedure.

EXAMPLE 16

THIO-BIS-(POLYBUTYL LACTONE POLYOL ESTERS)

Approximately 0.01 mole (26.3 g) of thio-bis-(polybutyl lactone acid) prepared as described in Example 9 and dissolved in 26.3 g of Solvent 150 Neutral oil and 0.01 mole (1.36 g) of pentaerythritol were mixed and heated to about 130° C. The temperature was raised to 200° C and maintained there for 2 hours. Infrared analysis of the filtered solution having about 50 wt. %, a.i. showed the presence of hydroxyl, lactone and ester functionality and analyzed for 0.39% sulfur. The hydroxyl number for the product solution was found to be 48.5.

EXAMPLE 17

Approximately 0.01 mole (26.3 g) of the thio-bis-(polyisobutyl lactone acid) prepared as described in Example 8 and 0.02 mole (2.8 g) of pentaerythritol were mixed and heated to 200° C for 2 hours. The product was diluted with an equal weight of Solvent 150 Neutral oil and filtered. Infrared analysis of the filtrate featured characteristic absorption bands at 2.9–3.0 (hydroxyl) and a broad band in the 5.65–5.8 micron region (lactone ester). The hydroxyl number for the product solution (50 wt. % a.i.) was found to be 53.

EXAMPLE 18

Five hundred grams (~0.385 moles) of PIBSA having an ($\overline{M}_n$) of 960 and a Sap. No. of 84 were dissolved in 60 ml of methylene chloride and cooled to 0° C.

While stirring at 0° C under a nitrogen blanket, 26 g (0.192 moles) of sulfur monochloride were added dropwise for a period of half hour. The reaction mixture was allowed to warm up to room temperature and stirred for about 10 hours.

One half of this product was diluted in 100 ml of p-dioxane and 6.9 g of water (ca. 0.38 moles) of water were added. The reaction mixture was refluxed for 10 hours in the presence of a catalytic amount of sulfuric acid (HCl evolution occurred during reflux). Thereafter, the solvent was removed by rotoevaporation and the mixture further heated to 130°–140° C. for 1 hour. The product featured an infrared spectrum with strong absorption bands in the 5.6–5.8 micron region (lactone acid) and analyzed for 2.43 wt. % sulfur. The IR spectrum of the diethylamine treated product revealed a strong lactone carbonyl band at 5.63 microns.

EXAMPLE 19

80 g (ca. 0.03 moles) of a dithio-bis-(polyisobutyl lactone acid) product prepared as described in Example 18 was heated to 190° C. While stirring under nitrogen blanket, 9.8 g (0.072 moles) of pentaerythritol were added and the stirred reaction mixture was heated to 220° C for 3 hours with nitrogen sparging. At the end of the third hour, an equal amount of Solvent 150 Neutral oil was added to the residue to provide a 50 wt. % a.i. solution. This solution was diluted with 200 ml of hexane and filtered, and then rotoevaporated at 100° C. for 3 hours. The resulting product solution disclosed an infrared spectrum with prominent carbonyl absorption bands ascribable to the desired lactone polyol ester product which featured a hydroxyl number of 90.8.

EXAMPLE 20

PENTAERYTHRITOL ESTER OF PIBSA

Ca.0.1 mole (200 g of a 51 wt. % solution in S150N oil) of PIBSA as described in Example 2 and 13.6 g (0.1 mole) of pentaerythritol were mixed and heated to 200° C. The reaction mixture was stirred at 200° C for about 3 hours and then filtered. The filtrate (50% a.i.) featured an infrared spectrum with a strong ester carbonyl absorption band at 5.8 microns and analyzed for 5.04% oxygen. The hydroxyl number for the ester product in solution (50 wt. % a.i.) was determined to be 57.4.

EXAMPLE 21

The reaction product of pentaerythritol and alkenyl chlorolactone acid according to U.S. Pat. No. 3,755,173 was prepared as follows:

130 g of PIBSA having a ($\overline{M}_n$) of about 960 and a Sap. No. of 84 was mixed with 10 cc of methanol and 80 ml of benzene. Chlorine gas was bubbled through the mixture for one hour while the temperature ranged between 26° C and 49° C. The reaction mixture was sparged with nitrogen for 2 hours and then rotoevaporated at 80° C for about 3 hours. The residue (135 g) was analyzed and found to have a chlorine content of 3.9 wt. %.

130 g of the chlorine-containing product were combined with 15.9 g of pentaerythritol and stirred under nitrogen for 12 hours at approximately 180° C. The product was then diluted with Solvent 150 Neutral oil to 50% a.i. and filtered through Celite 503. The filtrate (50% a.i.) analyzed for 2.04 wt. % chlorine.

EVALUATION OF ADDITIVES IN VARNISH INHIBITION TEST

Each test sample consisted of 10 grams of lubricating oil containing 0.07 of a gram of the additive concentrate (50% active) which results in a total of 0.35 wt. % additive present in the test sample. The test oil to which the additive is admixed was 9.93 grams of a commercial lubricating oil obtained from a taxi after 2,000 miles of driving with said lubricating oil. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, the gas containing a mixture of about 0.7 volume percent $SO_2$, 1.4 volume percent NO and balance air was bubbled through the test samples and during the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated at values of from 1 to 7 with the higher number being the greater amount of varnish. It has been found that this test correlates with the varnish results obtained as a consequence of carrying out an MSVC engine test. The results which are recorded in Table I indicate that the lactone polyol ester reaction products of this invention have superior varnish control over that activity shown by a halo-lactone polyol ester produced according to U.S. Pat. No. 3,755,173 and the conventional pentaerythritol ester of polyisobutenyl succinic anhydride as taught in U.S. Pat. No. 3,381,022 and as prepared in Example 20.

In the reaction of the lactone acid or ester reagent, it is preferred to have about one mole of polyol per carboxy group of the hydrocarbyl substituted lactone acid or ester reagent.

TABLE I

| Test Sample | Additive of Example | VIB Rating | Chemical Name of Additive |
|---|---|---|---|
| 1 | 12 | 4 | Polybutyl (($\overline{M}_n$) of 960) lactone pentaerythritol ester |
| 2 | 13 | 5 | Polybutyl (($\overline{M}_n$) of 1400) lactone pentaerythritol ester |
| 3 | 21 | 7 | Reaction product of pentaerythritol and alkenyl chlorolactone acid |
| 4 | 20 | 6 | Pentaerythritol ester of polyisobutenyl succinic anhydride |

What is claimed is:

1. An oil-soluble reaction product comprising principally lactone polyol ester having at least one hydroxy moiety, obtained from heating together a mixture of hydrocarbon-substituted lactone acid material and a polyol having 2–8 hydroxy groups and containing a total of 2 to 20 carbons, at a temperature of from about 100°–240° C. until esterification is complete by infrared analysis and/or cessation of water evolution, wherein said lactone acid material is obtained by lactonization of alkenyl succinic anhydride containing a total of 8 to 400 carbon atoms by intramolecular cyclization.

2. An oil-soluble reaction product according to claim 1 wherein said acid material is selected from the group consisting of acids and esters, and said polyol has the formula

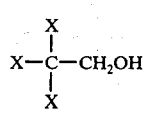

wherein X is hydrogen, alkyl or hydroxy alkyl, said alkyl groups having 1 to 3 carbon atoms, and at least one of said X is a hydroxy alkyl group of the structure $-(CH_2)_nOH$ where $n$ is 1 to 3.

3. An oil-soluble reaction product according to claim 2 wherein said hydrocarbon-substituted lactone acid material is polyisobutyl lactone carboxylic acid, said polyol is pentaerythritol, said mixture is substantially equimolar and said heating is continued until water of reaction is completely evolved.

4. An oil-soluble reaction product according to claim 3 wherein said polyisobutyl substituent contains from about 16 to 400 carbons.

5. An oil-soluble reaction product according to claim 4 wherein said polyisobutyl substituent contains from about 60 to 100 carbons.

6. Oil soluble hydrocarbyl lactone polyol ester product, useful as a lubricating oil additive, comprising principally ester represented by the formula:

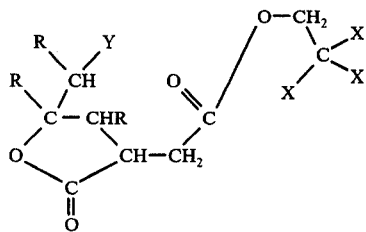

wherein R is selected from the group consisting of hydrogen and hydrocarbyl containing within the range of from 1 to 10,000 carbon atoms, with the restriction that at least one R has at least about 8 carbons; and X is selected from the group consisting of hydrogen, alkyl, hydroxy and hydroxyalkyl with the restriction that at least one X contains a hydroxy moiety; and Y is selected from the group consisting of hydrogen, hydroxyl, sulfo, alkylthio, alkyldithio and a sulfur bridge containing 1 to 4 sulfur atoms.

7. A hydrocarbyl lactone polyol ester according to claim 6 wherein X is a hydroxy alkyl group of the structure $-(CH_2)_nOH$ and $n$ is 1 to 3 and said hydrocarbyl group contains 16 to 400 carbons.

8. An oil-soluble thio-bis-(hydrocarbyl lactone polyol ester) represented by the formula:

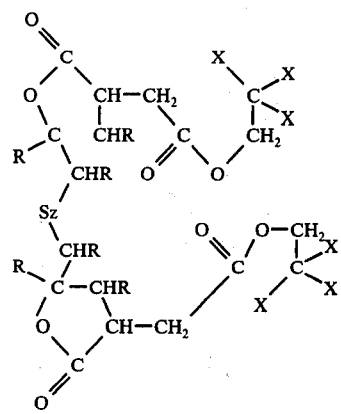

wherein R is selected from the group consisting of hydrogen and hydrocarbyl containing within the range of from 1 to 10,000 carbon atoms, with the restriction that at least one R has at least about 8 carbons, X is selected from the group consisting of hydrogen, alkyl, hydroxy, and hydroxy-alkyl with the restriction that at least one X is hydroxy alkyl, S represents sulfur and $z$ is an integer ranging from 1 to 4.

9. Polyisobutyl lactone pentaerythritol ester comprising principally ester represented by the formula:

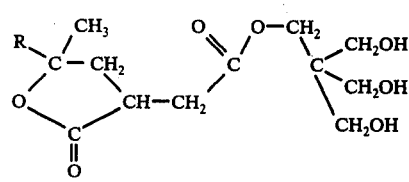

wherein R represents a polyisobutyl group containing 16 to 400 carbons.

10. A lubricating oil composition comprising: a major amount of lubricating oil and 0.01 to 20 wt. % of an oil-soluble reaction product comprising principally lactone polyol ester having at least one hydroxy moiety obtained from heating together a mixture of an oil-soluble hydrocarbon substituted lactone acid material and a polyol having 2 to 8 hydroxy groups and containing a total of 2 to 20 carbons at a temperature of from 100°–240° C. until esterification is complete by infrared analysis and/or cessation of water evolution indicating completion of the esterification reaction, wherein said lactone acid material is obtained by lactonization of alkenyl succinic anhydride containing a total of 8 to 400 carbon atoms by intramolecular cyclization.

11. A composition according to claim 10 wherein said acid material is selected from the group consisting of acids and esters, and said polyol has the formula

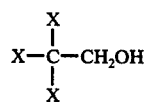

wherein X is hydrogen, alkyl or hydroxy alkyl, said alkyl groups having 1 to 3 carbon atoms, and at least one of said X is a hydroxy alkyl group of the structure $-(CH_2)_nOH$ where $n$ is 1 to 3.

12. A composition according to claim 10 wherein said polyol is pentaerythritol and said mixture is substantially equimolar.

13. An additive concentrate comprising: an amount of mineral lubricating oil in the range of 10 to 80 parts by weight, 20 to 90 parts by weight of an oil-soluble reaction product comprising principally lactone polyol ester having at least one hydroxy moiety obtained from heating together a mixture of an oil-soluble hydrocarbon substituted lactone acid material and a polyol having 2 to 8 hydroxy groups and containing a total of 2 to 20 carbons at a temperature of from 100°–240° C. until esterification is complete by infrared analysis and/or cessation of water evolution indicating completion of the esterification reaction, wherein said lactone acid material is obtained by lactonization of alkenyl succinic anhydride containing a total of 8 to 400 carbon atoms by intramolecular cyclization.

14. A process for preparing an oil-soluble reaction product comprising principally lactone polyol ester having at least one hydroxy moiety comprising the step of reacting about one molar amount of a polyol having 2 to 8 hydroxy groups and containing a total of 2 to 20 carbons of the formula:

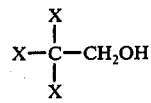

wherein X is hydrogen, alkyl or hydroxy alkyl, said alkyl groups having 1 to 3 carbon atoms, and at least one of said X is a hydroxy alkyl group of the structure —$(CH_2)_n$OH where $n$ is 1 to 3 with about a molar equivalent amount of an oil-soluble alkyl lactone acid material selected from the group consisting of acids and esters of said acids, at a temperature in the range of about 100° to 240° C. until esterification is complete by infrared analysis and/or cessation of water evolution indicating completion of the ester forming reaction, wherein said lactone acid material is obtained by lactonization of alkenyl succinic anhydride containing a total of 8 to 400 carbon atoms by intramolecular cyclization.

15. A process according to claim 14 wherein said polyol is pentaerythritol, said lactone acid material is polybutyl lactone acid and said molar equivalent amount is about one molar amount.

16. A process according to claim 14 wherein said polyol is pentaerythritol, said lactone acid material is thio-bis-(polybutyl lactone acid) and said molar equivalent amount is about one-half molar amount.

* * * * *